United States Patent
Suzuki et al.

(10) Patent No.: US 7,208,996 B2
(45) Date of Patent: Apr. 24, 2007

(54) CHARGE PUMP CIRCUIT

(75) Inventors: Tatsuya Suzuki, Kumagaya (JP); Yasuhiro Kaneda, Isesaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 259 days.

(21) Appl. No.: 11/089,031

(22) Filed: Mar. 25, 2005

(65) Prior Publication Data

US 2005/0213781 A1 Sep. 29, 2005

(30) Foreign Application Priority Data

Mar. 26, 2004 (JP) ............................. 2004-092639

(51) Int. Cl.
*G05F 1/10* (2006.01)
(52) U.S. Cl. ........................ 327/536; 327/157; 363/60
(58) Field of Classification Search ................ 327/536, 327/589; 363/59, 60
See application file for complete search history.

(56) References Cited

U.S. PATENT DOCUMENTS 6,429,723 B1 * 8/2002 Hastings ..................... 327/536
7,046,076 B2 * 5/2006 Daga et al. .................. 327/536

FOREIGN PATENT DOCUMENTS

JP 2001-211637 8/2001

* cited by examiner

*Primary Examiner*—Long Nguyen
(74) *Attorney, Agent, or Firm*—Morrison & Foerster LLP

(57) ABSTRACT

A reverse current is prevented in a charge pump circuit. A complementary pair of clocks CLK and *CLK varies while a first through a fourth charge transfer MOS transistors M11, M12, M13 and M14 are turned off. Then the second charge transfer MOS transistor M12 is turned on to discharge a first pumping capacitor CA and the third charge transfer MOS transistor M13 is turned on to charge a second pumping capacitor CB. Next, the complementary pair of clocks CLK and *CLK varies after the first through the fourth charge transfer MOS transistors M11, M12, M13 and M14 are turned off again. Then the fourth charge transfer MOS transistor M14 is turned on to discharge the second pumping capacitor CB and the first charge transfer MOS transistor M11 is turned on to charge the first pumping capacitor CA.

9 Claims, 8 Drawing Sheets

CHARGE PUMP CIRCUIT

CROSS-REFERENCE OF THE INVENTION

This invention is based on Japanese Patent Application No. 2004-092639, the content of which is incorporated herein by reference in its entirety.

BACKGROUND OF THE INVENTION

1. Field of the Invention

This invention relates to a charge pump circuit.

2. Description of the Related Art

Systems in which an EEPROM (Electrically Erasable Programmable Read Only Memory) or a flash memory is programmed and erased and systems in which an LCD (Liquid Crystal Display) or an analog switch is driven require a voltage higher than a power supply voltage Vdd.

Embedded charge pump circuits are commonly used in such systems. The charge pump circuit is a simple circuit that is capable of boosting a voltage using a single power supply in the system so that a voltage higher than the power supply voltage is provided.

In a common charge pump circuit, charge transfer MOS transistors are connected in series to form multiple stages of pumping packets so that an input voltage is boosted. Assuming the input voltage is Vdd and a threshold voltage of a transistor is Vd, the boosted voltage Vout of an N-stage charge pump circuit is expressed by an equation below.

$$V\text{out}=(N+1)(Vdd-Vd)$$

Further details may be found in Japanese Patent Publication No. 2001-211637, and in "On-chip High-Voltage Generation in NMOS Integrated Circuits Using an Improved Voltage Multiplier Technique," IEEE Journal of Solid-State Circuit, SC-11, No. 3, pp. 374–378, June 1976.

SUMMARY OF THE INVENTION

This invention is directed to offer a charge pump circuit suitable for a field of application that requires low current and low power consumption, such as a power supply circuit for a condenser microphone. More specifically, this invention is directed to prevent a voltage loss due to a reverse current in a charge transfer MOS transistor used in the charge pump circuit.

The charge pump circuit according to this invention includes a first switching element for charge transfer and a second switching element for charge transfer that are connected in series, and a first capacitor having a first terminal and a second terminal. The first terminal of the first capacitor is connected to a connecting point between the first switching element for charge transfer and the second switching element for charge transfer. The circuit also includes a third switching element for charge transfer and a fourth switching element for charge transfer that are connected in series, and a second capacitor having a first terminal and a second terminal. The first terminal of the second capacitor is connected to a connecting point between the third switching element for charge transfer and the fourth switching element for charge transfer. The circuit further includes a clock driver for a pair of complementary clocks that alternate between a first voltage level and a second voltage level. The clock driver provides the second terminal of the first capacitor with one of the complementary clocks and the second terminal of the second capacitor with another of the complementary clocks. The circuit includes an input terminal connected to the first switching element for charge transfer and the third switching element for charge transfer, a power supply providing the input terminal with an input voltage, and a control circuit that turns on the second switching element and the third switching element after changing corresponding voltage levels of the complementary clocks while the first switching element, the second switching element, the third switching element and the fourth switching element are turned off, and turns on the first switching element and the fourth switching element after changing corresponding voltage levels of the complementary clocks while the first switching element, the second switching element, the third switching element and the fourth switching element are turned off.

DETAILED DESCRIPTION OF THE INVENTION

Figure 1:
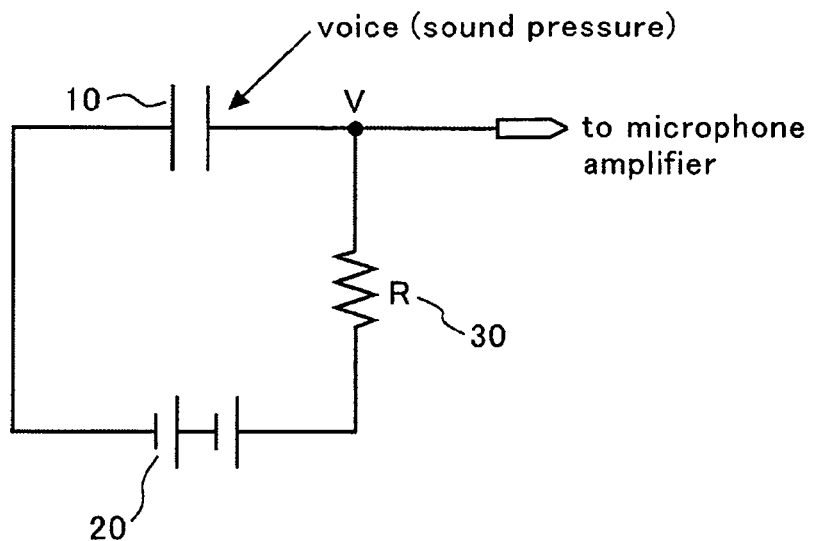
FIG. 1 is a circuit diagram showing a condenser microphone system to which a charge pump circuit according to this invention is applied.

Next, a charge pump circuit according to an embodiment of this invention will be explained referring to figures. FIG. 1 is a circuit diagram of a condenser microphone system to which the charge pump circuit is applied. A condenser microphone 10 made of a pair of capacitor electrodes and a dielectric disposed between them is formed on a semiconductor die. A biasing power supply 20 is connected to the pair of capacitor electrodes through a resistor 30. A capacitance of the condenser microphone 10 varies when an external voice (sound pressure) is applied to the pair of capacitor electrodes to cause a fine vibration. The vibration of the capacitor electrodes causes a fine variation in an output signal V of the condenser microphone 10. An audio output signal is obtained by amplifying the output signal V with a microphone amplifier. The charge pump circuit is used as the biasing power supply 20.

Figure 2:
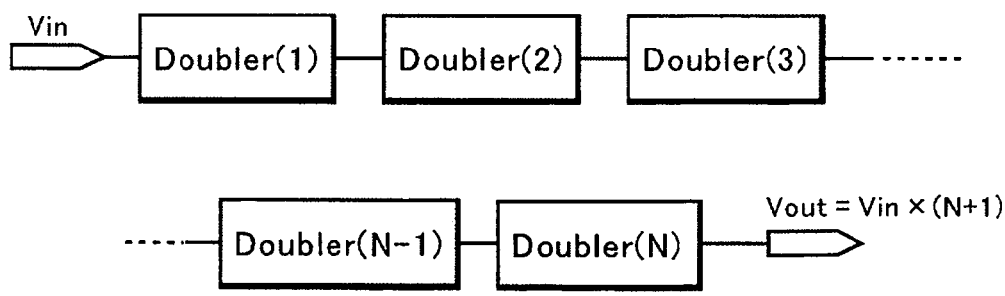
FIG. 2 is a circuit diagram showing a power supply for biasing the condenser microphone system.

FIG. 2 is a circuit diagram showing the biasing power supply 20. This circuit is made of n-stages of voltage doublers, i.e. doubler (1)–doubler (N), connected in series. An input voltage Vin is applied to the doubler (1), the first stage voltage doubler, and an output voltage Vout=Vin+N× Vdd is obtained from the doubler (N), the final stage voltage doubler. Each of the voltage doublers adds a power supply voltage Vdd of the voltage doublers to the input voltage Vin. Vin=Vdd is assumed in an example shown in FIG. 2, thus Vout=Vin×(N+1) is obtained.

Figure 3:
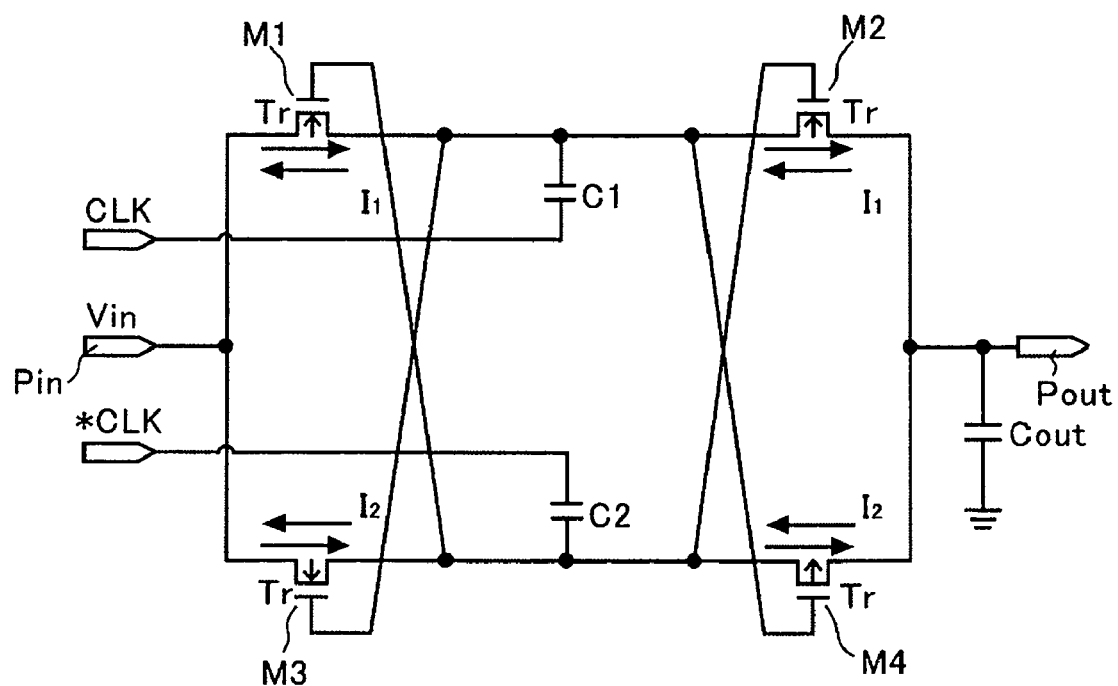
FIG. 3 is a circuit diagram showing a conventional charge pump circuit.

Next, a circuit constituting the doubler (1)–the doubler (N) shown in FIG. 2, that is, a concrete circuit forming the charge pump circuit will be explained. FIG. 3 is a circuit diagram showing an example of a charge pump circuit according to a prior art. A first and a second charge transfer MOS transistors M1 and M2 are connected in series. One end of a first pumping capacitor C1 is connected to a connecting point between the charge transfer MOS transistors M1 and M2. A clock CLK from a clock driver (not shown) is applied to another end of the pumping capacitor C1. The input voltage Vin from an input terminal Pin is applied to a source of the first charge transfer MOS transistor M1. A source of the second charge transfer MOS transistor M2 is connected to an output terminal Pout.

A third and a fourth charge transfer MOS transistors M3 and M4 are connected in series. One end of a second pumping capacitor C2 is connected to a connecting point between the charge transfer MOS transistors M3 and M4. A reverse clock *CLK from the clock driver (not shown) is applied to another end of the pumping capacitor C2. The input voltage Vin from the input terminal Pin is applied to a source of the third charge transfer MOS transistor M3. A source of the fourth charge transfer MOS transistor M4 is connected to the output terminal Pout.

A smoothing capacitor Cout is also connected to the output terminal Pout. The first and the third charge transfer MOS transistors M1 and M3 are N-channel type, while the second and the fourth charge transfer MOS transistors M2 and M4 are P-channel type. It is assumed that a power supply voltage is Vdd and that amplitude of the clock CLK and the reverse clock *CLK is also Vdd.

The charge pump circuit operates as described below. During a period in which the clock CLK is "high", M2 and M3 are turned on and M1 and M4 are turned off. Thus the first pumping capacitor C1 is discharged while the second pumping capacitor C2 is charged. A discharging current from the first pumping capacitor C1 flows through M2 and an output voltage Vout=Vin+Vdd is obtained. During a period in which the clock CLK is "low", on the other hand, M1 and M4 are turned on and M2 and M3 are turned off. Thus the second pumping capacitor C2 is discharged while the first pumping capacitor C1 is charged. A discharging current from the second pumping capacitor C2 flows through M4 and the output voltage Vout=Vin+Vdd is obtained. Voltage boosting is performed efficiently since the discharging current flows over a whole period of a clock cycle through either M2 or M4.

However, because the charge transfer MOS transistors turn on and off simultaneously in this charge pump circuit, there arise reverse currents I1 and I2 flowing during the switching of the charge transfer MOS transistors and causing a voltage loss ΔV in the charge pump circuit. That is, the output voltage Vout comes to be Vout=Vin+Vdd−ΔV.

For example, when the clock CLK varies from "high" to "low", M2 switches from on to off while M1 switches from off to on. However, it is unavoidable that there arises a transient period during which both M1 and M2 turn on, since the MOS transistors need a certain amount of time for switching. The reverse current I1 flows from the output terminal Pout where the boosted voltage is generated to the input terminal Pin through M2 and M1 during the period both M1 and M2 are turned on. Similarly when the clock CLK varies from "low" to "high", the reverse current I2 flows from the output terminal Pout to the input terminal Pin through M4 and M3.

Figure 4:
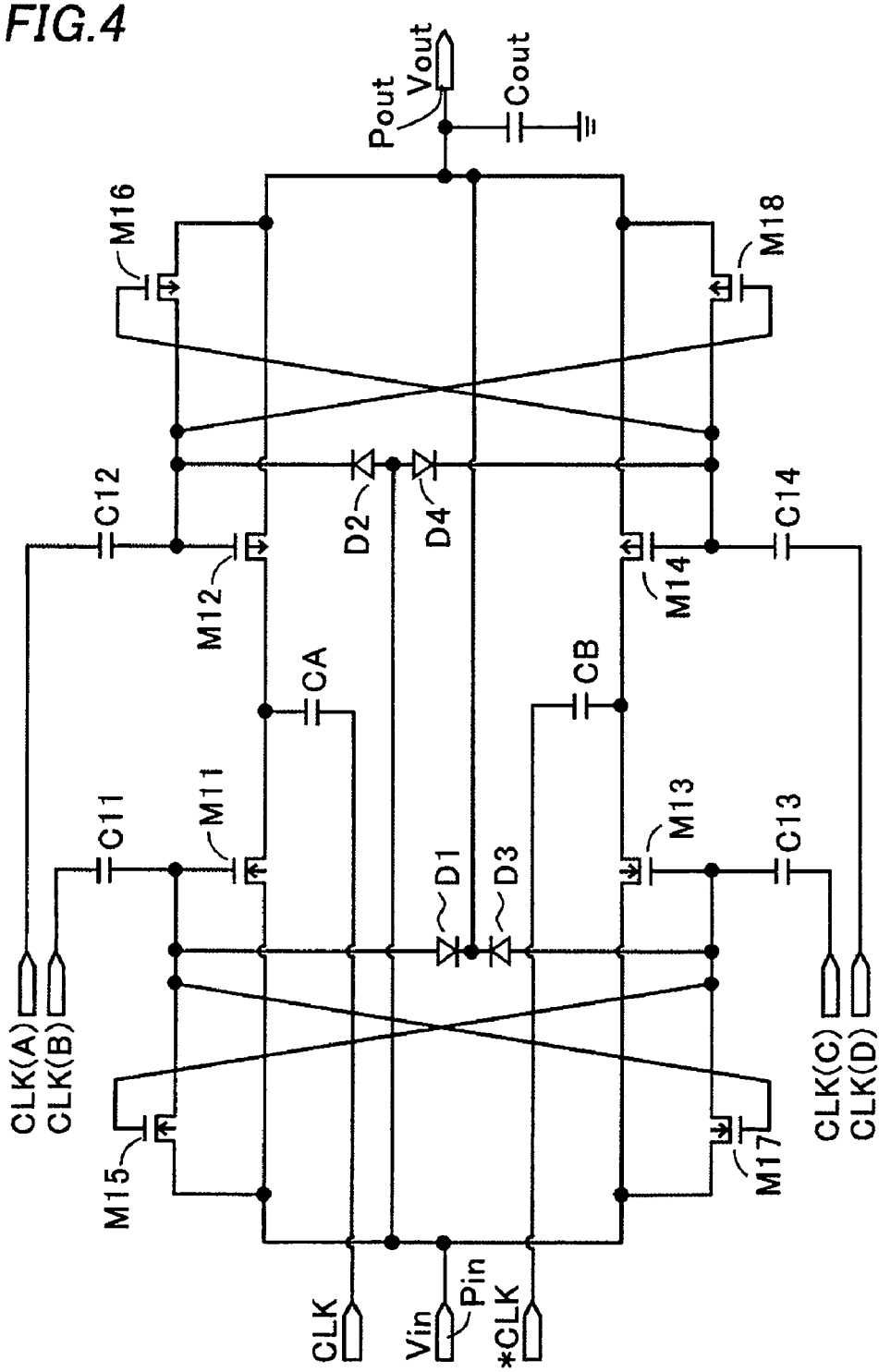
FIG. 4 is a circuit diagram showing a charge pump circuit according to an embodiment of this invention.

A charge pump circuit that prevents such reverse currents will be described hereafter. FIG. 4 is a circuit diagram showing a charge pump circuit according to an embodiment of this invention. A first and a second charge transfer MOS transistors M11 and M12 are connected in series. One end of a first pumping capacitor CA is connected to a connecting point between the charge transfer MOS transistors M11 and M12. A clock CLK from a clock driver (not shown) is applied to another end of the pumping capacitor CA. An input voltage Vin from an input terminal Pin is applied to a source of the first charge transfer MOS transistor M11. A source of the second charge transfer MOS transistor M12 is connected to an output terminal Pout.

A third and a fourth charge transfer MOS transistors M13 and M14 are connected in series. One end of a second pumping capacitor CB is connected to a connecting point between the charge transfer MOS transistors M13 and M14. A reverse clock *CLK (an inversion of the clock CLK) from the clock driver (not shown) is applied to another end of the pumping capacitor CB. The input voltage Vin from the input terminal Pin is applied to a source of the third charge transfer MOS transistor M13. A source of the fourth charge transfer MOS transistor M14 is connected to the output terminal Pout.

A smoothing capacitor Cout is also connected to the output terminal Pout. The first and the third charge transfer MOS transistors M11 and M13 are N-channel type, while the second and the fourth charge transfer MOS transistors M12 and M14 are P-channel type.

A first clock CLK(B) is provided to a gate of the first charge transfer MOS transistor M11 through a first coupling capacitor C11. A first biasing MOS transistor M15 is connected between the input terminal Pin and the gate of the first charge transfer MOS transistor M11. A third clock CLK(C) is provided to a gate of the third charge transfer MOS transistor M13 through a third coupling capacitor C13.

A third biasing MOS transistor M17 is connected between the input terminal Pin and the gate of the third charge transfer MOS transistor M13. A gate of the first biasing MOS transistor M15 and the gate of the third charge transfer MOS transistor M13 are connected with each other. And a gate of the third biasing MOS transistor M17 and the gate of the first charge transfer MOS transistor M11 are connected with each other.

Similarly, a second clock CLK(A) is provided to a gate of the second charge transfer MOS transistor M12 through a second coupling capacitor C12. A second biasing MOS transistor M16 is connected between the output terminal Pout and the gate of the second charge transfer MOS transistor M12. A fourth clock CLK(D) is provided to a gate of the fourth charge transfer MOS transistor M14 through a fourth coupling capacitor C14. A fourth biasing MOS transistor M18 is connected between the output terminal Pout and the gate of the fourth charge transfer MOS transistor M14.

A gate of the second biasing MOS transistor M16 and the gate of the fourth charge transfer MOS transistor M14 are connected with each other. And a gate of the fourth biasing MOS transistor M18 and the gate of the second charge transfer MOS transistor M12 are connected with each other.

Furthermore, a first initial voltage setting diode D1 is connected between the gate of the first charge transfer MOS transistor M11 and the output terminal Pout. That is, an anode of the first initial voltage setting diode D1 is connected to the gate of the first charge transfer MOS transistor M11 and a cathode of the first initial voltage setting diode D1 is connected to the output terminal Pout. Similarly, a third initial voltage setting diode D3 is connected between the gate of the third charge transfer MOS transistor M13 and the output terminal Pout.

That is, an anode of the third initial voltage setting diode D3 is connected to the gate of the third charge transfer MOS transistor M13 and a cathode of the third initial voltage setting diode D3 is connected to the output terminal Pout.

And a second initial voltage setting diode D2 is connected between the gate of the second charge transfer MOS transistor M12 and the input terminal Pin. That is, a cathode of the second initial voltage setting diode D2 is connected to the gate of the second charge transfer MOS transistor M12 and an anode of the second initial voltage setting diode D2 is connected to the input terminal Pin. Similarly, a fourth initial voltage setting diode D4 is connected between the gate of the fourth charge transfer MOS transistor M14 and the input terminal Pin.

That is, a cathode of the fourth initial voltage setting diode D4 is connected to the gate of the fourth charge transfer MOS transistor M14 and an anode of the fourth initial voltage setting diode D4 is connected to the input terminal Pin.

Figure 5:
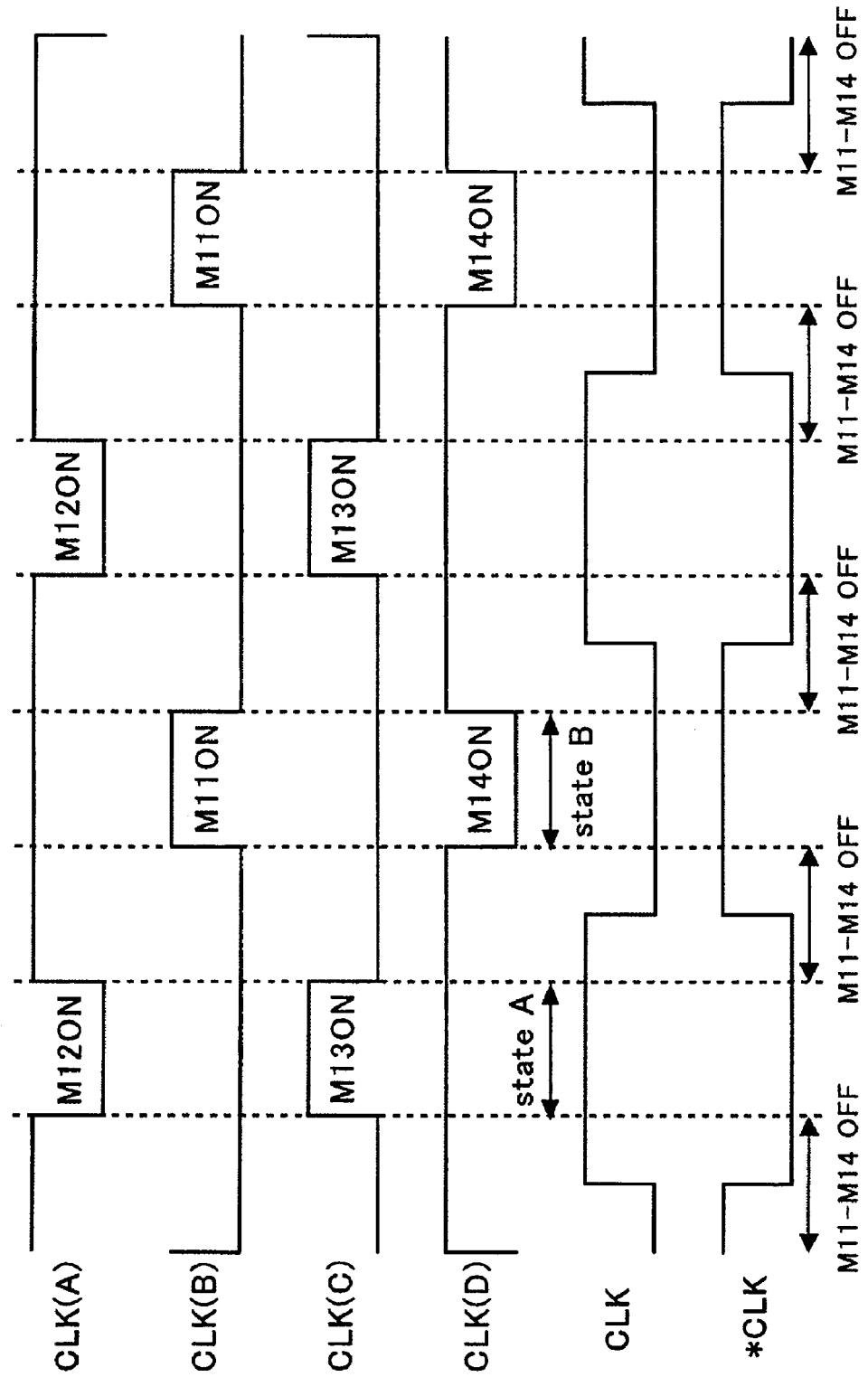
FIG. 5 is a timing chart showing an operation of the charge pump circuit according to the embodiment of this invention.
Figure 6:
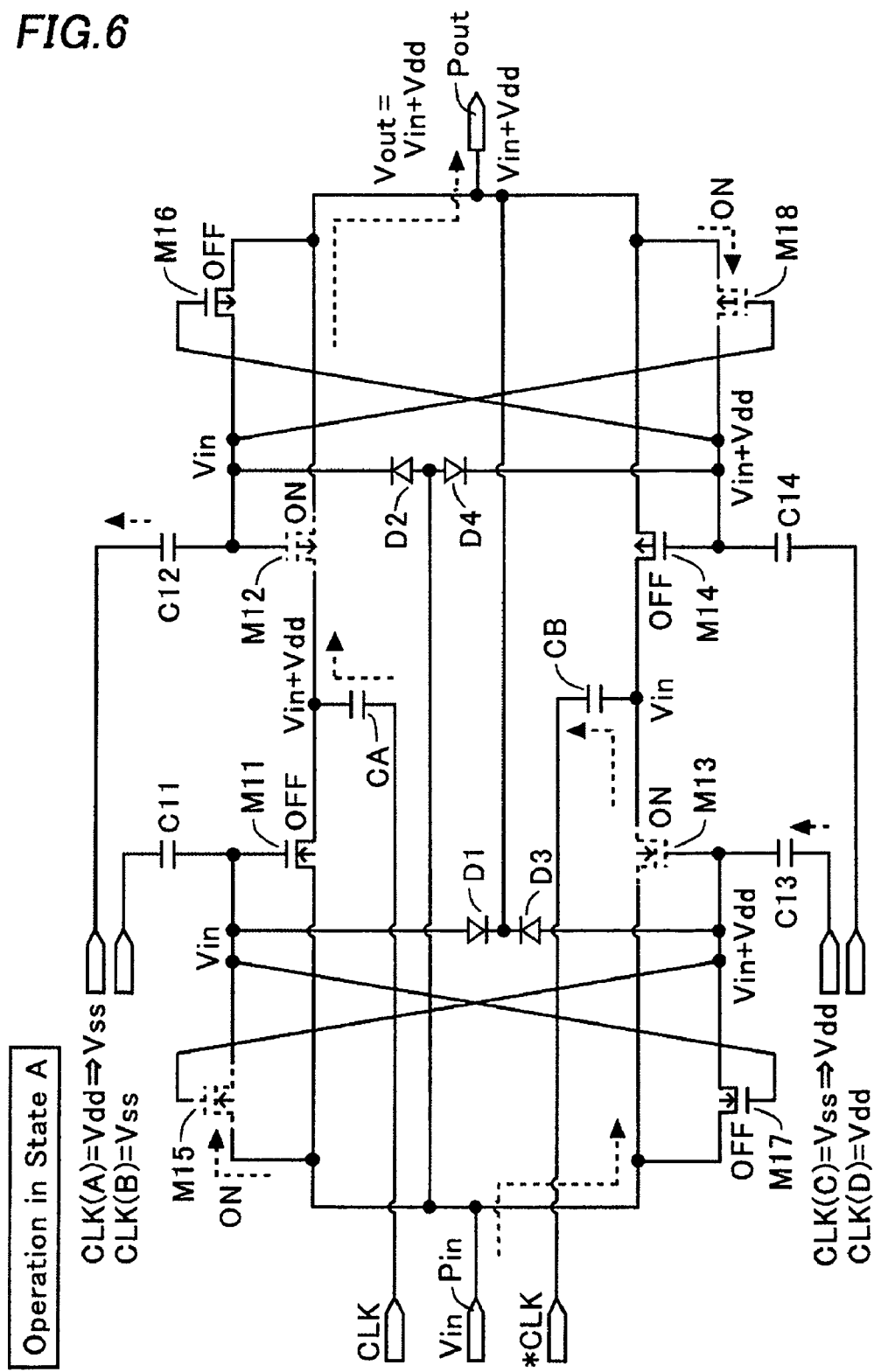
FIG. 6 is a circuit diagram showing the operation of the charge pump circuit according to the embodiment of this invention.
Figure 7:
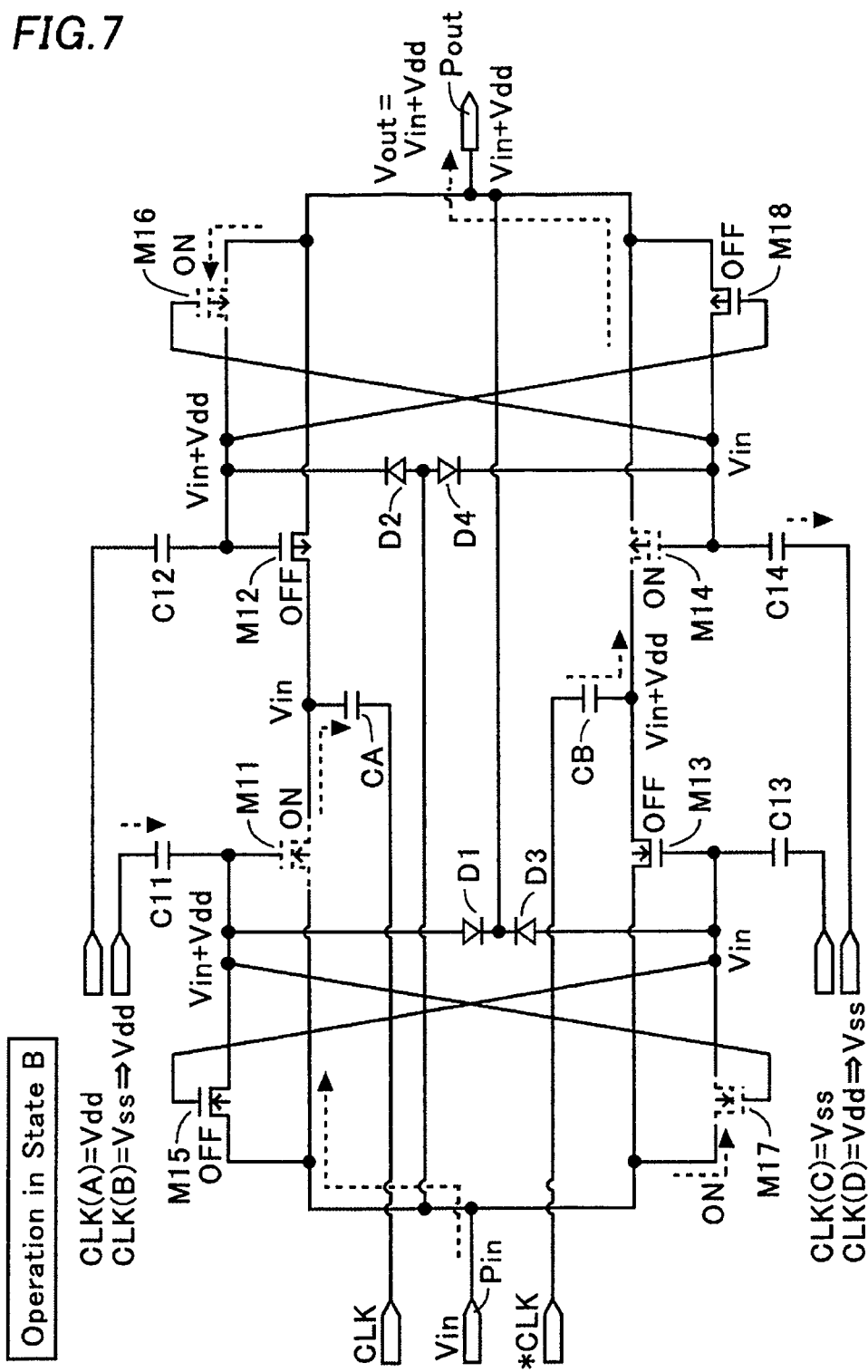
FIG. 7 is a circuit diagram showing the operation of the charge pump circuit according to the embodiment of this invention.

Operation of the charge pump circuit of FIG. 4 described above will be explained hereafter, referring to figures. FIG. 5 is a timing chart of the clocks in the charge pump circuit. FIG. 6 is a circuit diagram to explain the operation in a state A (M12 and M13 are turned on) shown in FIG. 5, while FIG. 7 is a circuit diagram to explain the operation in a state B (M11 and M14 are turned on) shown in FIG. 5.

In the operation of the charge pump circuit, it is important that the clock CLK and the reverse clock *CLK from the clock driver are turned from "low" to "high" or from "high" to "low" while all the charge transfer MOS transistors M11, M12, M13 and M14 are turned off, and then the second charge transfer MOS transistor M12 is turned on to discharge the first pumping capacitor CA and the third charge transfer MOS transistor M13 is turned on to charge the second pumping capacitor CB, as shown in FIG. 5 (the state A).

Next, the clock CLK and the reverse clock *CLK from the clock driver are turned from "high" to "low" or from "low" to "high" after all the charge transfer MOS transistors M11, M12, M13 and M14 are turned off again, and then the fourth charge transfer MOS transistor M14 is turned on to discharge the second pumping capacitor CB and the first charge transfer MOS transistor M11 is turned on to charge the first pumping capacitor CA, as shown in FIG. 5 (the state B).

By doing so, a reverse current is completely prevented, since simultaneous turning-on of the first charge transfer MOS transistor M11 and the second charge transfer MOS transistor M12 does not take place and simultaneous turning-on of the third charge transfer MOS transistor M13 and the fourth charge transfer MOS transistor M14 does not take place as well.

Next, the operation of the charge pump circuit will be explained in detail. The first charge transfer MOS transistor M11, the second charge transfer MOS transistor M12, the third charge transfer MOS transistor M13 and the fourth charge transfer MOS transistor M14 are simply referred to as M11, M12, M13 and M14, respectively, while the first biasing MOS transistor M15, the second biasing MOS transistor M16, the third biasing MOS transistor M17 and the fourth biasing MOS transistor M18 are simply referred to as M15, M16, M17 and M18, respectively, in the following explanation.

It is assumed that the power supply voltage of the clock driver is Vdd, the high level is Vdd and the low level is Vss (ground voltage) for the clock CLK and the reverse clock *CLK. Also, it is assumed that the high level is Vdd and the low level is Vss for the first clock CLK(B), the second clock CLK(A), the third clock CLK(C) and the fourth clock CLK(D). And the input voltage Vin is applied to the input terminal Pin.

First, the clock CLK is turned from "low" to "high" and the reverse clock *CLK is turned from "high" to "low" while all of M11, M12, M13 and M14 are turned off. As a result, a voltage at the connecting node between M11 and M12 varies from Vin to Vin+Vdd while a voltage at the connecting node between M13 and M14 varies from Vin+Vdd to Vin.

Next, the second clock CLK(A) is turned from "high" to "low" while the third clock CLK(C) is turned from "low" to "high" at the same time. Thereupon the charge pump circuit is in the state A shown in FIG. 5. The operation of the circuit in this state will be explained hereafter, referring to FIG. 6.

When the second clock CLK(A) is turned from "high" to "low", a voltage at the gate of M12 and a voltage at the gate of M18 become Vin to turn M12 and M18 on. Electric charge in the first pumping capacitor CA is discharged to the output terminal Pout by the turning-on of M12. An output voltage Vout=Vin+Vdd is obtained at the output terminal Pout thereupon. And M14 is turned off because a voltage at the gate of M14 becomes the same voltage Vin+Vdd as the output voltage Vout by the turning-on of M18.

When the third clock CLK(C) is turned from "low" to "high", on the other hand, a voltage at the gate of M13 and a voltage at the gate of M15 become Vin+Vdd to turn M13 and M15 on. The second pumping capacitor CB is charged by the turning-on of M13. And M11 is turned off because a voltage at the gate of M11 becomes Vin by the turning-on of M15.

Next, after all of M11, M12, M13 and M14 are turned off again, the clock CLK is turned from "high" to "low" and the reverse clock *CLK is turned from "low" to "high". As a result, the voltage at the connecting node between M11 and M12 varies from Vin+Vdd to Vin while the voltage at the connecting node between M13 and M14 varies from Vin to Vin+Vdd.

Then the first clock CLK(B) is turned from "low" to "high" while the fourth clock CLK(D) is turned from "high" to "low" at the same time. Thereupon the charge pump circuit is in the state B shown in FIG. 5. The operation of the circuit in this state will be explained hereafter, referring to FIG. 7.

When the first clock CLK(B) is turned from "low" to "high", the voltage at the gate of M11 and a voltage at the gate of M17 become Vin+Vdd to turn M11 and M17 on. The first pumping capacitor CA is charged by the turning-on of M11. And M13 is turned off because the voltage at the gate of M13 becomes Vin by the turning-on of M17.

When the fourth clock CLK(D) is turned from "high" to "low", on the other hand, the voltage at the gate of M14 and a voltage at the gate of M16 become Vin to turn M14 and M16 on. Electric charge in the second pumping capacitor CB is discharged to the output terminal Pout by the turning-on of M14. An output voltage Vout=Vin+Vdd is obtained at the output terminal Pout thereupon. And M12 is turned off because the voltage at the gate of M12 becomes the same voltage Vin+Vdd as the output voltage Vout by the turning-on of M16.

Figure 8:
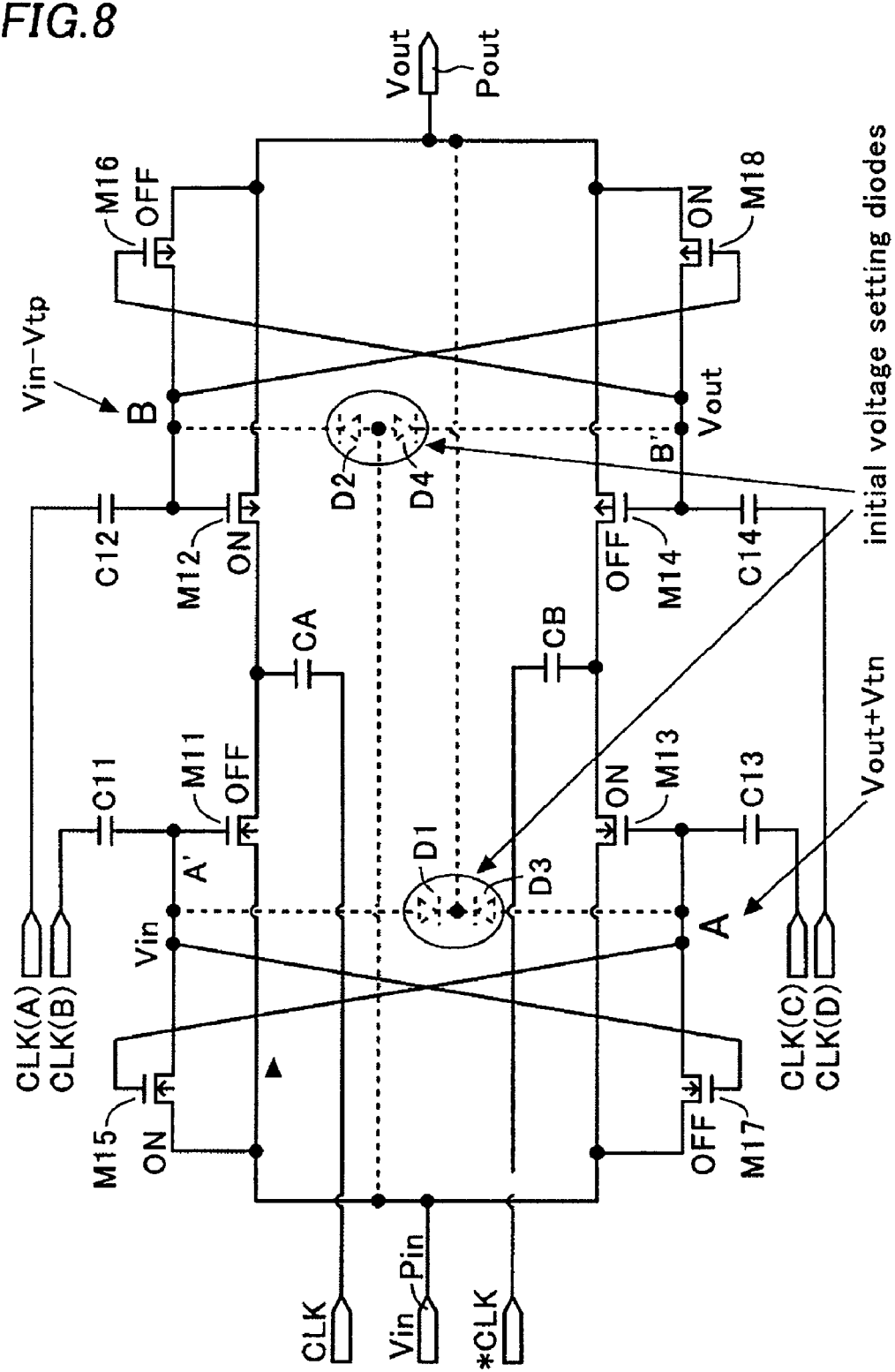
FIG. 8 is a circuit diagram showing the operation of the charge pump circuit according to the embodiment of this invention.

Next, operation of the first through the fourth initial voltage setting diodes D1, D2, D3 and D4 will be explained hereafter, referring to FIG. 8. The first and the third initial voltage setting diodes D1 and D3 are added to secure the operation of the circuit under an extraordinary initial condition that an initial voltage at a node A or an initial voltage at a node A' in FIG. 8 is higher than Vout+Vtn, thus one of M15 and M17 is always turned on while the other is always turned off. Here Vtn is a threshold voltage of M15 and M17.

Suppose the initial voltage at the node A is higher than Vout+Vtn. Then the voltage at the gate of M15 is also higher than Vout+Vtn, which keeps M15 turned on. Also, since the voltage at the node A' is kept at Vin, the voltage at the gate of M17 remains at Vin, which keeps M17 turned off. Therefore, the first and the third initial voltage setting diodes D1 and D3 are provided so that a forward current of the diode flows to reduce the voltage at the node A or A' when the voltage at the node A or A' is higher than Vout.

The second and the fourth initial voltage setting diodes D2 and D4 are added to secure the operation of the circuit under an extraordinary initial condition that an initial voltage at a node B or an initial voltage at a node B' in FIG. 8 is lower than Vin+Vtp, thus one of M16 and M18 is always turned on while the other is always turned off. Here Vtp is a threshold voltage of M16 and M18. Suppose the initial voltage at the node B is lower than Vin+Vtp. Then the voltage at the gate of M18 is also lower than Vin+Vtp, which keeps M18 turned on.

Also M16 is always turned off, since the voltage at the node B' is kept at Vout and thus the voltage at the gate of M16 remains at Vout. Therefore, the second and the fourth initial voltage setting diodes D2 and D4 are provided so that a forward current of the diode flows to increase the voltage at the node B or B' when the voltage at the node B or B' is lower than Vin.

Figure 9:
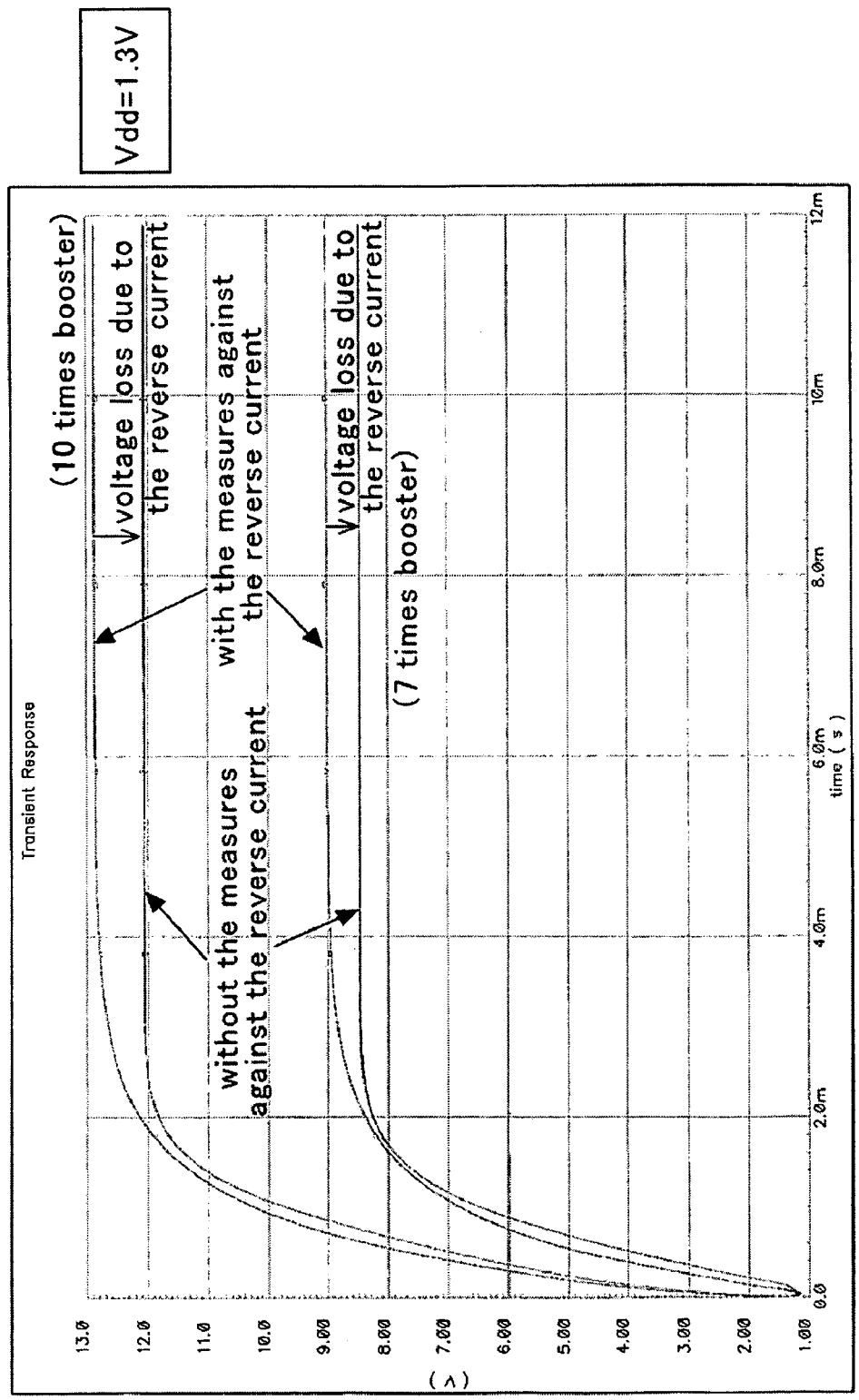
FIG. 9 shows a result of a simulation of the charge pump circuit according to the embodiment of this invention.

FIG. 9 shows a result of simulations of the output voltage Vout of the charge pump circuit according to the embodiment. While voltage loss due to the reverse current are seen for the circuit without the measures against the reverse current (the circuit shown in FIG. 3), such voltage loss is not seen for the circuit with the measures against the reverse current (the circuit shown in FIG. 4).

The charge pump circuit according to the embodiment of this invention can prevent the reverse current in the charge transfer MOS transistor and the resultant voltage loss.

What is claimed is:

1. A charge pump circuit comprising:
   a first switching element for charge transfer and a second switching element for charge transfer that are connected in series;
   a first capacitor comprising a first terminal and a second terminal, the first terminal of the first capacitor being connected to a connecting point between the first switching element for charge transfer and the second switching element for charge transfer;
   a third switching element for charge transfer and a fourth switching element for charge transfer that are connected in series;
   a second capacitor comprising a first terminal and a second terminal, the first terminal of the second capacitor being connected to a connecting point between the third switching element for charge transfer and the fourth switching element for charge transfer;
   a clock driver for a pair of complementary clocks that alternate between a first voltage level and a second voltage level, the clock driver providing the second terminal of the first capacitor with one of the complementary clocks and providing the second terminal of the second capacitor with another of the complementary clocks;
   an input terminal connected to the first switching element for charge transfer and the third switching elements for charge transfer;
   a power supply providing the input terminal with an input voltage; and
   a control circuit that turns on the second switching element and the third switching element after changing corresponding voltage levels of the complementary clocks while the first switching element, the second switching element, the third switching element and the fourth switching element are turned off, and turns on the first switching element and the fourth switching element after changing corresponding voltage levels of the complementary clocks while the first switching element, the second switching element, the third switching element and the fourth switching element are turned off.

2. The charge pump circuit of claim 1, wherein the first switching element comprises a first charge transfer MOS transistor, the second switching element comprises a second charge transfer MOS transistor, the third switching element comprises a third charge transfer MOS transistor and the fourth switching element comprises a fourth charge transfer MOS transistor.

3. The charge pump circuit of claim 2, wherein the control circuit comprises a first clock source to provide a gate of the first charge transfer MOS transistor with a first clock through a first coupling capacitor, a first biasing MOS transistor to provide the gate of the first charge transfer MOS transistor with the input voltage, a second clock source to provide a gate of the third charge transfer MOS transistor with a second clock through a second coupling capacitor, and a second biasing MOS transistor to provide the gate of the third charge transfer MOS transistor with the input voltage, wherein the first charge transfer MOS transistor and the second biasing transistor are turned on and the third charge transfer MOS transistor is turned off when the first clock changes from a first potential to a second potential, and the third charge transfer MOS transistor and the first biasing MOS transistor are turned on and the first charge transfer MOS transistor is turned off when the second clock changes from the first potential to the second potential.

4. The charge pump circuit of claim 3, further comprising an initial voltage setting circuit that sets an initial voltage at the gate of the first charge transfer MOS transistor and an initial voltage at the gate of the third charge transfer MOS transistor.

5. The charge pump circuit of claim 4, wherein the initial voltage setting circuit comprises a first diode disposed between the gate of the first charge transfer MOS transistor and an output terminal of the charge pump circuit and a second diode disposed between the gate of the third charge transfer MOS transistor and the output terminal.

6. The charge pump circuit of claim 2, wherein the control circuit comprises a first clock source to provide a gate of the second charge transfer MOS transistor with a first clock through a first coupling capacitor, a first biasing MOS transistor to provide the gate of the second charge transfer MOS transistor with an output voltage, a second clock source to provide a gate of the fourth charge transfer MOS transistor with a second clock through a second coupling capacitor, and a second biasing MOS transistor to provide the gate of the fourth charge transfer MOS transistor with the output voltage, wherein the second charge transfer MOS transistor and the second biasing transistor are turned on and the fourth charge transfer MOS transistor is turned off when the first clock changes from a first potential to a second potential, and the fourth charge transfer MOS transistor and the first biasing MOS transistor are turned on and the second charge transfer MOS transistor is turned off when the second clock changes from the first potential to the second potential.

7. The charge pump circuit of claim 6, further comprising an initial voltage setting circuit that sets an initial voltage at the gate of the second charge transfer MOS transistor and an initial voltage at the gate of the fourth charge transfer MOS transistor.

8. The charge pump circuit of claim 7, wherein the initial voltage setting circuit comprises a first diode disposed between the gate of the second charge transfer MOS transistor and the input terminal and a second diode disposed between the gate of the fourth charge transfer MOS transistor and the input terminal.

9. The charge pump circuit of claim 1, wherein the charge pump circuit is connected to a condenser microphone as a power supply thereof.

* * * * *